US012574750B2

(12) United States Patent
Aksu et al.

(10) Patent No.: US 12,574,750 B2
(45) Date of Patent: Mar. 10, 2026

(54) METHOD AND SYSTEM FOR SPECTRUM SHARING BETWEEN TERRESTRIAL AND NON-TERRESTRIAL NETWORKS

(71) Applicant: Verizon Patent and Licensing Inc., Basking Ridge, NJ (US)

(72) Inventors: Arda Aksu, Lafayette, CA (US); Lynda Ng, Castro Valley, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 432 days.

(21) Appl. No.: 18/170,843

(22) Filed: Feb. 17, 2023

(65) Prior Publication Data

US 2024/0284189 A1 Aug. 22, 2024

(51) Int. Cl.
*H04W 16/14* (2009.01)
*H04W 48/02* (2009.01)

(52) U.S. Cl.
CPC ........... *H04W 16/14* (2013.01); *H04W 48/02* (2013.01)

(58) Field of Classification Search
CPC .............................. H04W 48/02; H04W 16/14
See application file for complete search history.

(56) References Cited

U.S. PATENT DOCUMENTS

| | | | | |
|---|---|---|---|---|
| 11,540,232 B1 * | 12/2022 | Marupaduga | ......... | H04W 72/54 |
| 2009/0286488 A1 * | 11/2009 | Singh | ..................... | H04B 15/00 |
| | | | | 455/73 |
| 2017/0374596 A1 * | 12/2017 | Benammar | ........ | H04B 7/18517 |
| 2023/0047987 A1 * | 2/2023 | Tseng | ..................... | H04W 36/08 |
| 2024/0224256 A1 * | 7/2024 | Kim | ..................... | H04W 48/18 |
| 2024/0259977 A1 * | 8/2024 | Yu | ..................... | H04W 56/0045 |

* cited by examiner

*Primary Examiner* — Dai Phuong

(57) ABSTRACT

A method, a device, and a non-transitory computer-readable storage medium are described in relation to a spectrum sharing between terrestrial and non-terrestrial networks service. The spectrum sharing between terrestrial and non-terrestrial networks service may intelligently manage radios of radio access network devices based on the coverage areas of non-terrestrial network devices and their shared frequency spectrum. The service may disable and enable the radios associated with the shared frequency spectrum based on time periods and coverage area factors. For example, the disablement may include the turning off the radios and the enablement may include the turning on of the radios.

20 Claims, 7 Drawing Sheets

INPUT
430

OUTPUT
435

PROCESSOR
410

MEMORY/STORAGE
415

SOFTWARE
420

COMMUNICATION
INTERFACE
425

405

400

500

RECEIVE RADIO CONFIGURATION INFORMATION PERTAINING TO A FREQUENCY
OF A NON-TERRESTRIAL NETWORK DEVICE
505

DISABLE USAGE OF THE FREQUENCY FOR A FIRST TIME PERIOD
510

ENABLE USAGE OF THE FREQUENCY FOR A SECOND TIME PERIOD
515

600

RECEIVE RADIO CONFIGURATION INFORMATION PERTAINING TO A FREQUENCY OF A NON-TERRESTRIAL NETWORK DEVICE AND A TERRESTRIAL RAN DEVICE
605

CONFIGURE A DISABLEMENT OF THE FREQUENCY FOR A FIRST TIME PERIOD AT THE TERRESTRIAL RAN DEVICE
610

CONFIGURE AN ENABLEMENT OF THE FREQUENCY FOR A SECOND TIME PERIOD AT THE TERRESTRIAL RAN DEVICE
615

700

RECEIVE NON-TERRESTRIAL NETWORK DEVICE INFORMATION THAT INCLUDES FREQUENCY AND COVERAGE AREA INFORMATION
705

GENERATE TERRESTRIAL NETWORK INFORMATION THAT CORRELATES TO THE NON-TERRESTRIAL NETWORK DEVICE INFORMATION
710

IDENTIFY A TERRESTRIAL NETWORK DEVICE
715

TRANSMIT AT LEAST THE TERRESTRIAL NETWORK INFORMATION TO THE TERRESTRIAL NETWORK DEVICE
720

METHOD AND SYSTEM FOR SPECTRUM SHARING BETWEEN TERRESTRIAL AND NON-TERRESTRIAL NETWORKS

BACKGROUND

Development and design of networks present certain challenges from a network-side perspective and an end device perspective. For example, Next Generation (NG) wireless networks, such as Fifth Generation New Radio (5G NR) networks are being deployed and are under development. The establishment and maintenance of wireless connectivity between the end device and a wireless network remains an ongoing issue.

DETAILED DESCRIPTION

Figure 1:
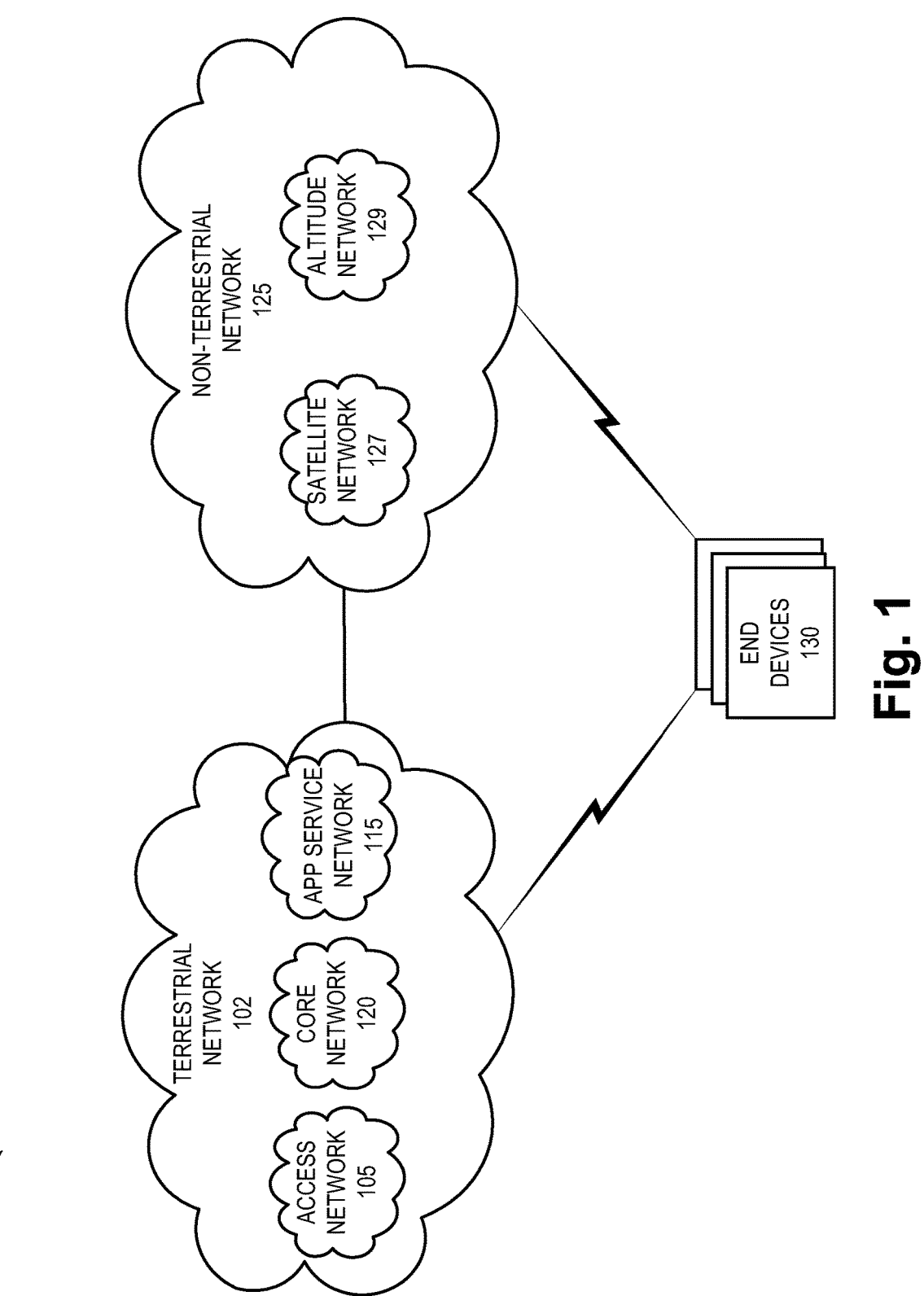
FIG. 1 is a diagram illustrating an exemplary environment in which an exemplary embodiment of a spectrum sharing between terrestrial and non-terrestrial networks service may be implemented.

The following detailed description refers to the accompanying drawings. The same reference numbers in different drawings may identify the same or similar elements. Also, the following detailed description does not limit the invention.

Satellite direct to device communication has become popular in recent years. A satellite network is typically inferior to a terrestrial network (TN), such as a cellular network, due to its limited performance and available bandwidth, for example. By way of further example, there are performance challenges related to a non-terrestrial network (NTN), such as a satellite network, pertaining to management of distance, speed, and mobility of both the satellite and the end device. Additionally, for example, reliability, stability, propagation delay, throughput, bandwidth, and other metrics may impact end device connectivity and quality of service for application service sessions. However, the satellite network may supplement wireless service. Depending on the scenario, the coverage areas associated with the satellite network and the cellular network may overlap fully, partially, or not at all.

End devices are typically configured to use terrestrial radio spectrum (e.g., radio frequencies and bands). Accordingly, the satellite network would need to use the same radio spectrum to enable wireless connectivity with the end devices. However, a satellite device should not use the same frequency or band for the same coverage area and time period as a terrestrial radio access network (RAN) device, for example.

According to exemplary embodiments, a spectrum sharing between terrestrial and non-terrestrial networks service is described. According to an exemplary embodiment, the terrestrial network may be implemented to include a wireless network, such as a cellular network, a mobile network, a RAN, or a non-cellular network, for example. According to an exemplary embodiment, the non-terrestrial network may be implemented as a satellite network or a type of air-based network (e.g., a high altitude platform system (HAPS), air-to-ground, etc.), for example. The non-terrestrial network may be of a proprietary and/or standard compliant (e.g., Third Generation Partnership Project (3GPP), 3GPP2, International Telecommunication Union (ITU), European Telecommunications Standards Institute (ETSI), GSM Association (GSMA), and the like) nature. According to an exemplary embodiment, an end device includes the spectrum sharing between terrestrial and non-terrestrial networks service, as described herein.

According to an exemplary embodiment, the spectrum sharing between terrestrial and non-terrestrial networks service may include a network device associated with a non-terrestrial network operator (NTNO) that may manage non-terrestrial network information, as described herein. For example, the non-terrestrial network information may include different types of information, which may be correlated, that supports usage of non-terrestrial network devices by the end devices via shared radio spectrum, as described herein. For example, the non-terrestrial network information may include location of a satellite, time period of availability and unavailability, and satellite frequency.

According to an exemplary embodiment, the spectrum sharing between terrestrial and non-terrestrial networks service may include a network device associated with a terrestrial network operator (TNO) that may manage radio spectrum sharing based on non-terrestrial-to-terrestrial network information, as described herein. For example, the non-terrestrial-to-terrestrial network information may include location of a satellite, time period of availability and unavailability, satellite frequency, and terrestrial network information. According to some exemplary embodiments, the terrestrial network information may include coverage area information. For example, the coverage area information may include coverage area of the satellite in relation to terrestrial network devices, such as RAN devices, core devices, application layer network devices, network management devices, and/or other types of network devices, as described herein. According to an exemplary embodiment, the network device may coordinate the use of radio spectrum between a non-terrestrial network device and a terrestrial network device. For example, the network device may control when a RAN device of relevance may use or not use radio spectrum shared with a satellite device, as described herein.

In view of the foregoing, the spectrum sharing between terrestrial and non-terrestrial networks service may manage the usage of shared radio spectrum between terrestrial and non-terrestrial networks by an end device and support continuous end device connectivity with a network in an optimal manner. The spectrum sharing between terrestrial and non-terrestrial networks service may improve the access and use of application services by the end device, as described herein. The spectrum sharing between terrestrial and non-terrestrial networks service may improve network resource utilization for RAN devices in which underutilized and/or overutilized radios and frequencies may be supported by non-terrestrial network devices, as well as supplement geographic coverage areas (e.g., no cellular coverage, poor cellular coverage, etc.).

FIG. 1 is a diagram illustrating an exemplary environment 100 in which an exemplary embodiment of a spectrum sharing between terrestrial and non-terrestrial networks service may be implemented. As illustrated, environment 100 includes a terrestrial network 102 and a non-terrestrial network 125. Terrestrial network 102 may include an access network 105, an application ("app") service network 115, and a core network 120. Non-terrestrial network 125 may include a satellite network 127 and an altitude-based network 129. Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, non-terrestrial network 125 may not include altitude-based network 129. Additionally, or alternatively, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or network access to an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). Network devices may include non-virtual, logical, and/or physical network devices.

Environment 100 includes communication links between the networks and between the networks and end devices 130. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane.

Environment 100 may include other types of planes of communication. A message communicated in support of the spectrum sharing between terrestrial and non-terrestrial networks service may use at least one of these planes of communication. Additionally, an interface of a network device may be modified (e.g., relative to an interface defined by a standards body, such as Third Generation Partnership Project (3GPP), 3GPP2, International Telecommunication Union (ITU), European Telecommunications Standards Institute (ETSI), GSM Association (GSMA), and the like) or a new interface of the network device may be provided in order to support the communication (e.g., transmission and reception of messages, an information element (IE), an attribute value pair (AVP), an object, a header, a parameter, or another form of a data instance) between network devices and the spectrum sharing between terrestrial and non-terrestrial networks service logic of the network device. According to various exemplary implementations, the interface of the network device and/or end device 130 may be a service-based interface, a reference point-based interface, an Open Radio Access Network (O-RAN) interface, a 5G interface, another generation of interface (e.g., 5.5G, Sixth Generation (6G), Seventh Generation (7G), etc.), a satellite interface, or some other type of communication interface.

Terrestrial network 102 may include one or multiple networks of one or multiple types and/or technologies that may be ground-based. Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), an O-RAN, and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a Wi-Fi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105.

Access network 105 may include different and multiple functional splitting, such as options 1, 2, 3, 4, 5, 6, 7, or 8 that relate to combinations of access network 105 and a core network (e.g., core network 120) including an Evolved Packet Core (EPC) network and/or an NG core (NGC) network (not illustrated), or the splitting of the various layers (e.g., physical layer, media access control (MAC) layer, radio link control (RLC) layer, and packet data convergence protocol (PDCP) layer, etc.), plane splitting (e.g., user plane, control plane, etc.), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (COMP), various duplex schemes (e.g., frequency division duplex (FDD), time division duplex (TDD), half-duplex FDD (H-FDD), etc.), and/or another type of connectivity service (e.g., NSA new radio (NR), SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, advanced wireless service (AWS) frequencies, LTE frequency bands, personal communication service (PCS) frequencies, and the like), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices (not illustrated). For example, the access devices may be implemented to include a next generation Node B (gNB), an evolved Long Term Evolution (eLTE) evolved Node B (eNB), an eNB, a radio network controller (RNC), a RAN intelligent controller (RIC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a WiMax device, a hotspot device, a fixed wireless access customer premise equipment (FWA CPE) that provides a wireless access service, or the like). According to some exemplary implementations, the access device may include a combined functionality of multiple RATs (e.g., 4G and 5G functionality, 5G and 5.5G functionality, etc.) via soft and hard bonding based on demands and needs. According to some exemplary implementations, the access device may include an integrated functionality, such as a CU-CP and a CU-UP, or other integrations of split RAN nodes.

According to various exemplary implementations, the access device may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) and adaptive beamforming (also known as full-dimensional agile MIMO), two dimensional (2D) beamforming, antenna spacing, tilt (relative to the ground), radiation pattern, directivity, elevation, planar arrays, and so forth. Depending on the implementation, the access device may provide a wireless access service at a cell, a sector, a sub-sector/zone, carrier, and/or other configurable level. For example, the sub-sector/zone level may include multiple divisions of a geographic area of a sector relative to the access device. By way of further example, the sector may be divided based on proximity to the antenna of the access device (e.g., near, mid, far) and/or another criterion. According to another example, radio coverage of a location may be divided based on a Military Grid Reference System (MGRS) or another type of grid system to produce geo-bins. The size and/or shape of each geo-bin may be configurable. The size and/or shape of a geo-bin may depend on the type of the access device (e.g., eNB versus gNB), attributes of the access device (e.g., antenna configuration, radio frequency band of beam, etc.), and/or other factors (e.g., terrain of the radio covered locale).

According to an exemplary embodiment, at least some of the access devices, as described herein, may include logic that provides an exemplary embodiment of a spectrum sharing between terrestrial and non-terrestrial networks service. For example, the access device may remove, turn off, or suspend the use of a frequency from a list of frequencies. For example, the frequency, which may be shared with non-terrestrial network 125, may be used to communicate with end device 130 when coverage is provided during a time period. Additionally, the access device may add, turn on, or unsuspend the use of a frequency from the list of frequencies. For example, the access device may reuse the frequency when non-terrestrial network 125 may no longer be able to provide coverage or for other reasons, as described herein.

Application service network 115 may include one or multiple networks of one or multiple types and technologies that provides an application service. For example, application service network 115 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology. Application service network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software-defined (SD) network, a virtual network, a packet-switched network, a data center, a data network, or other type of application service layer network that may provide access to and may host an end device application service.

Depending on the implementation, application service network 115 may include various network devices such as external devices. For example, the external devices may include virtual network devices (e.g., virtualized network functions (VNFs), servers, host devices, application functions (AFs), application servers (ASs), server capability servers (SCSs), containers, hypervisors, virtual machines (VMs), network function virtualization infrastructure (NFVI), and/or other types of virtualization elements, layers, hardware resources, operating systems, engines, etc.) that may be associated with application services for use by end devices 130. By way of further example, external devices may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, application service network 115 may include one or multiple types of core devices, as described herein.

The external devices may host one or multiple types of application services. For example, the application services may pertain to broadband services in dense areas (e.g., pervasive video, smart office, operator cloud services, video/ photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, conferencing, instant messaging), video streaming, and/or other types of wireless and/or wired application services. The external devices may also include other types of network devices that support the operation of application service network 115 and the provisioning of application services, such as an orchestrator, an edge manager, an operations support system (OSS), a local domain name system (DNS), registries, and/or external devices that may pertain to various network-related functions (e.g., security, management, charging, billing, authentication, authorization, policy enforcement, development, etc.).

According to an exemplary embodiment, the external devices may include a network device that provides a spectrum sharing between terrestrial and non-terrestrial networks service. According to an exemplary embodiment, the network device may manage non-terrestrial-to-terrestrial network information, as described herein. For example, the non-terrestrial-to-terrestrial network information may include different types of information, which may be correlated, that supports usage of non-terrestrial devices by end device 130 via shared radio spectrum, as described herein. For example, the non-terrestrial-to-terrestrial network information may include location of a satellite, time period of availability, satellite frequency, and terrestrial network information. The terrestrial network information may include coverage areas of the satellite in relation to terrestrial network devices, such as RAN devices, core devices, application layer network devices, and/or other types of network devices, as described herein. The network device may generate the terrestrial network information based on location and network topology information of the terrestrial network. The network device may correlate the terrestrial network information to the non-terrestrial network information. The network device may update the non-terrestrial-to-terrestrial network information based on communication with a non-terrestrial network, as described herein.

Core network 120 may include one or multiple networks of one or multiple network types and technologies. Core network 120 may include a complementary network of access network 105. For example, core network 120 may be implemented to include a 5G core network, an evolved packet core (EPC) of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices, such as core devices. For example, the core devices may include a user plane function (UPF), a Non-3GPP Interworking Function (N3IWF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network data analytics function (NWDAF), a network exposure function (NEF), a service capability exposure function (SCEF), a lifecycle management (LCM) device, a mobility management entity (MME), a packet data network gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

The core devices may include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), and/or other combined nodes (e.g., an HSS with a UDM and/or UDR, an MME with an AMF, etc.). Also, the core devices may include a split core device. For example, the core device may include a session management (SM) PCF, an access management (AM) PCF, a user equipment (UE) PCF, and/or another type of split architecture associated with another core device, as described herein.

According to an exemplary embodiment, a core device includes logic that provides an exemplary embodiment of a spectrum sharing between terrestrial and non-terrestrial networks service, as described herein. For example, the core device may instruct an access device to remove from a list of frequencies, turn off a radio of, reduce power of the radio (e.g., relative to a threshold or normal level), or suspend the use of a frequency at the access device. Additionally, the core device may instruct the access device to add to the list of frequencies, turn on the radio of, increase power of the radio (e.g., to a threshold or normal level), or unsuspend the use of a frequency at the access device. The core device may provide the spectrum sharing between terrestrial and non-terrestrial networks service based on non-terrestrial-to-terrestrial network information, as described herein.

Access network 105, application service network 115, and/or core network 120 may include other types of network devices, such as transport devices. The transport devices may include a router, a switch, a relay, and the like.

Non-terrestrial network 125 may include one or multiple networks of one or multiple types and/or technologies that may be aerial, space, and/or altitude based. Satellite network 127 may include one or multiple types of satellite networks of one or multiple technologies. For example, satellite network 127 may include a low earth orbit (LEO) satellite network, a medium earth orbit (MEO), a geostationary or geosynchronous orbit (GEO) satellite network, or another type of satellite network (e.g., future generation, non-LEO, non-MEO, non-GEO, etc.). Satellite network 127 may include a satellite, such as a LEO satellite, a MEO satellite, a GEO satellite, or another type of satellite. Satellite network 127 and the satellites may provide a cellular device-satellite communications service. Satellite network 127 may include a ground station. The ground station may include a station (also known as an earth station, for example) that is configured to communicate with the satellite of satellite network 127. For example, the ground station may transmit data to the satellite, receive data from the satellite, or both. The ground station may provide cellular device-satellite communications service. According to some exemplary embodiments, the access device (e.g., of access network 105) may be integrated with the ground station. According to some exemplary embodiments, the ground station may be configured to communicate directly or indirectly (e.g., via the access device) to end device 130. According to such exemplary embodiments, the ground station may include antennas and communication logic for communication to and from the satellites and other antennas and other communication logic for communication to and from end device 130. The ground station may be co-located with the access device.

Altitude-based network 129 may include one or multiple types of networks of one or multiple technologies that may be non-satellite based. For example, altitude-based network 129 may include a HAPS network, an air-to-ground network, an unmanned aerial device-based network, and/or the like.

According to an exemplary embodiment, satellite network 127 and/or altitude network 129 may include a network device that provides a spectrum sharing between terrestrial and non-terrestrial networks service. According to an exemplary embodiment, the network device may manage non-terrestrial network information, as described herein. For example, the non-terrestrial network information may include different types of information, which may be correlated, that supports usage of non-terrestrial devices by end device 130 via shared radio spectrum, as described herein. For example, the non-terrestrial network information may include location of a satellite, time period of availability, and satellite frequency. The network device may update the non-terrestrial network information based on communication with a non-terrestrial network, as described herein.

End device 130 includes a device that has wireless communication capabilities. End device 130 may have non-wireless communication capabilities (e.g., wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, a fixed wireless device, a router, a sensor, an automated guided vehicle (AGV), an industrial robot, or another type of user equipment (UE). End device 130 may be configured to execute various types of software (e.g., applications, programs, etc.). The number and the types of software may vary among end devices 130. End device 130 may include "edge-aware" and/or "edge-unaware" application service clients. For purposes of description, end device 130 is not considered a network device.

According to an exemplary embodiment, end device 130 includes logic that provides an exemplary embodiment of a spectrum sharing between terrestrial and non-terrestrial networks service, as described herein.

Figure 2:
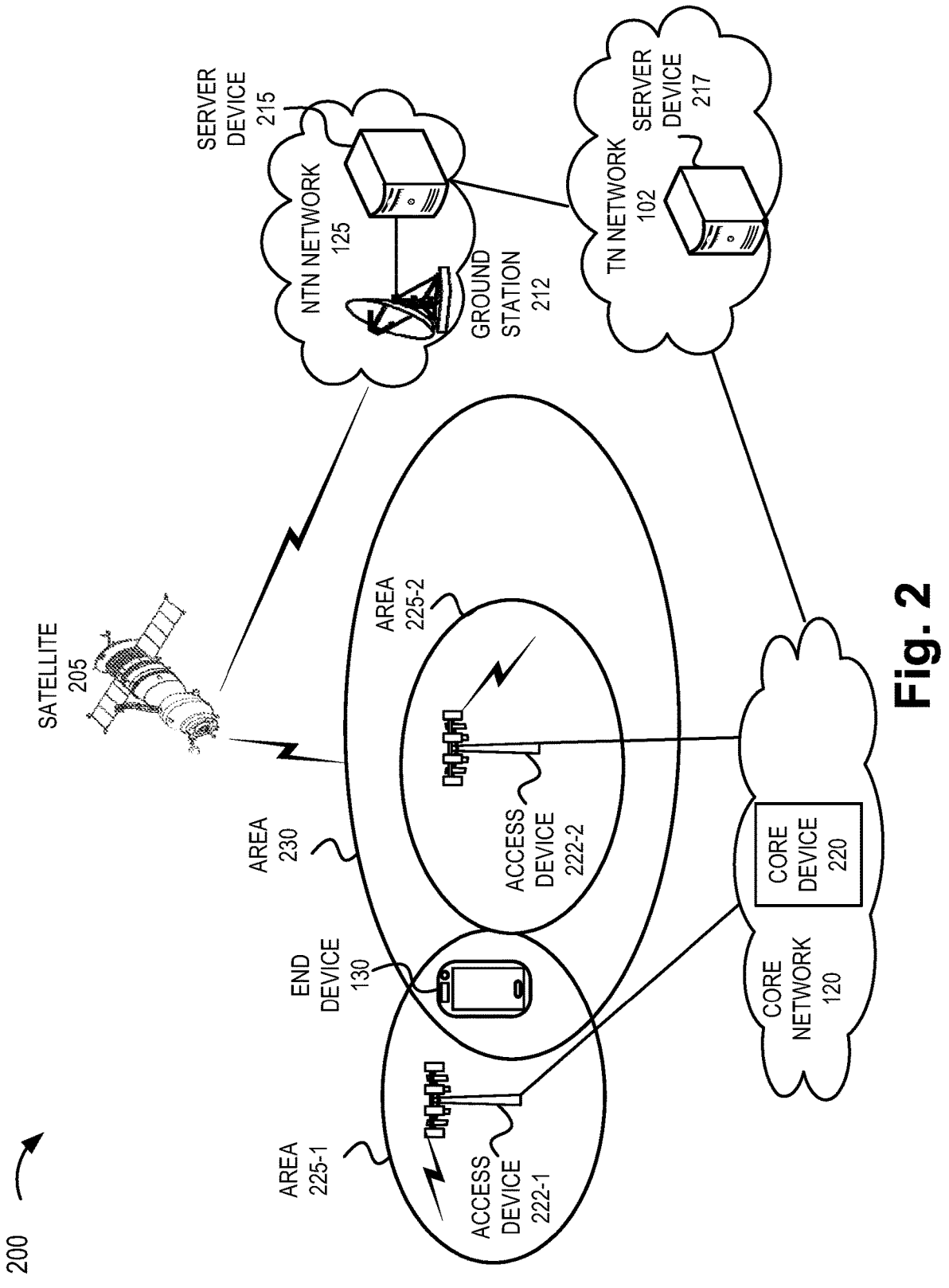
FIG. 2 is a diagram illustrating another exemplary environment in which an exemplary embodiment of the spectrum sharing between terrestrial and non-terrestrial networks service may be implemented.

FIG. 2 is a diagram illustrating another exemplary environment 200 in which an exemplary embodiment of a spectrum sharing between terrestrial and non-terrestrial networks service may be implemented. As illustrated, environment 200 includes a satellite 205 of non-terrestrial network 125 with a coverage area 230, a ground station 212 and a server device 215 of non-terrestrial network 125, and a server device 217 of terrestrial network 102, a core device 220 of core network 120. Environment 200 further includes an access device 222-1 with a coverage area 225-1 and an access device 222-2 with a coverage area 225-2 of access network 105, and a coverage area 230 of satellite 205. Access devices 222-1 and 222-2 may also be referred to individually or generally as access device 222. Coverage areas 225-1 and 225-2 may also be referred to individually or generally as coverage area 225.

Satellite 205 may be a geosynchronous orbit (GSO), a geostationary orbit (GEO) a medium earth orbit (MEO), a low earth orbit (LEO), or the like, satellite device or constellation. Satellite network 127 may include a ground station. Ground station 212 may be configured to communicate with satellite 205.

Server device 215 may acquire, store, manage, and update non-terrestrial network information. For example, the non-terrestrial network information may include locations of non-terrestrial network devices, time periods of availability, and satellite frequencies. Server device 215 may obtain non-terrestrial network information from ground station 212 and/or another source device associated with NTN network 125.

Server device 217 may acquire, store, manage, and update non-terrestrial-to-terrestrial network information. For example, the non-terrestrial-to-terrestrial network information may include locations of non-terrestrial network devices, time periods of availability, satellite frequencies, and terrestrial network information. Server device 217 may generate the terrestrial network information based on an analysis of the non-terrestrial network information and network topology, location information, and network management information associated with a terrestrial network and terrestrial network devices of relevance (e.g., access devices, core devices, application layer devices, etc.). By way of example, server device 217 may receive the non-terrestrial network information from server device 215. Server device 217 may determine a coverage associated with satellite 205 and map the coverage area to terrestrial network devices. For example, server device 217 may calculate which access devices 222 or other access devices that are within the coverage area 230 of satellite 205 based on the position/location of access devices 222. Server device 217 may also identify the radio spectrum associated with the access devices 222 that are common to satellite 205. Server device 217 may also identify, based on the network topology information, which core device(s) 220 that may be connected to access devices 222. For example, core device 220 may be an AMF, an MME, a network management device, or another type of network device that may provision, instruct, and/or manage access device 222 in accordance with the spectrum sharing between terrestrial and non-terrestrial networks service, as described herein. Based on the analysis, server device 217 may provide core device 220 with non-terrestrial-to-terrestrial network information (or a portion thereof). For example, server device 217 may send to each core device 220, for access devices 222 to which belong to core device 220, the non-terrestrial-to-terrestrial network information (or portion). In this way, core device 220 may use this information to coordinate usage and non-usage of radio spectrum (e.g., frequency, frequency band, cell, channel, etc.) between access device 222 and satellite 205.

Figure 3:
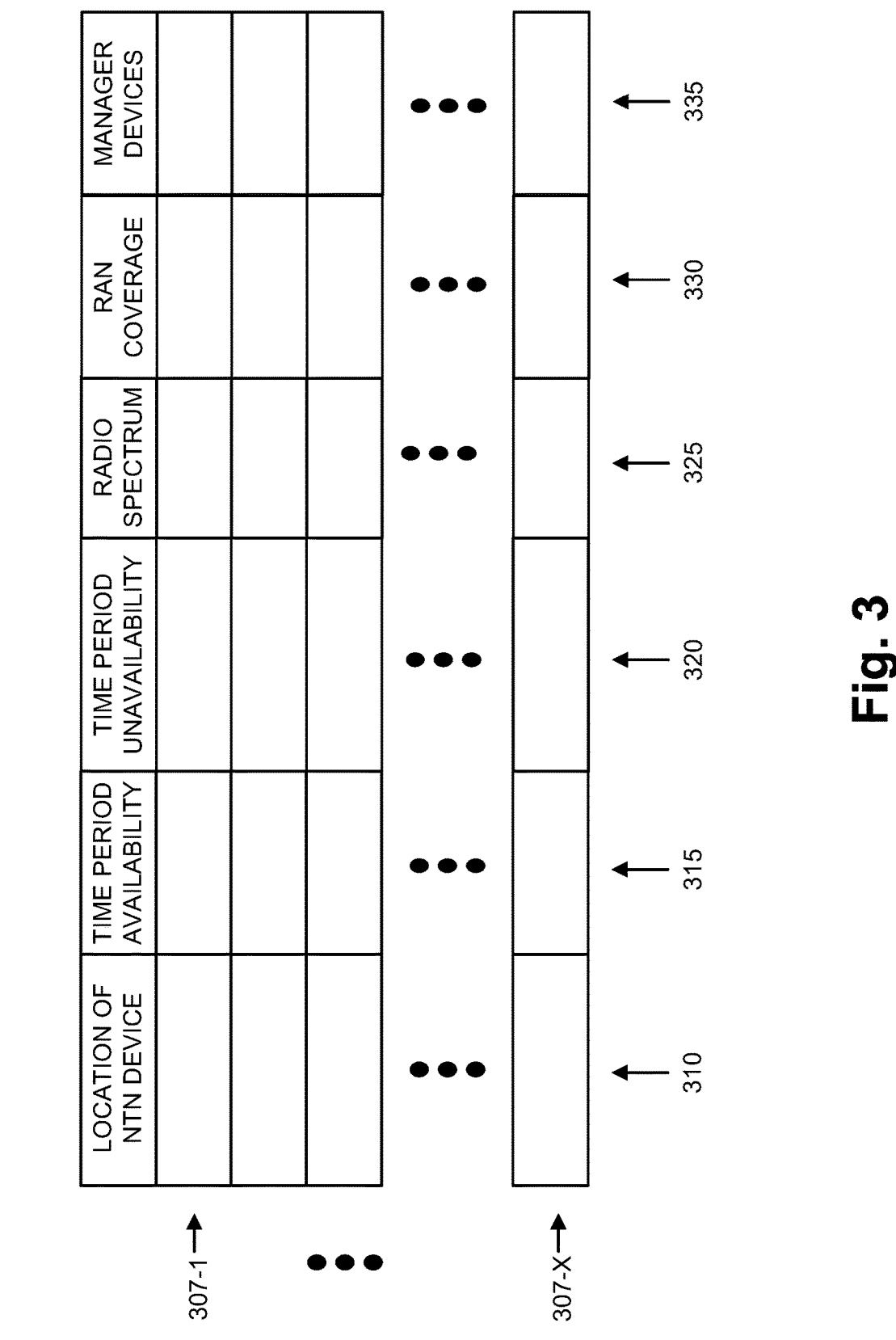
FIG. 3 is a diagram illustrating exemplary information in which an exemplary embodiment of the spectrum sharing between terrestrial and non-terrestrial networks service may be implemented.

FIG. 3 is a diagram illustrating an exemplary embodiment of non-terrestrial-to-terrestrial network information. As illustrated, a table 305 may include a location of NTN device field 310, a time period of availability field 315, a time period of unavailability field 320, a radio spectrum field 325, a RAN coverage field 330, and manager devices field 335. As further illustrated, table 305 may include records 307-1 through 307-X (also referred to records 307, or individually or generally as record 307) in which record 307 may include a correlation between multiple fields of the non-terrestrial-to-terrestrial network information. The non-terrestrial-to-terrestrial network information is illustrated in tabular form merely for the sake of description. In this regard, according to other exemplary embodiments, non-terrestrial-to-terrestrial network information may be implemented in a data structure different from a table, a database, or the like.

Location of NTN device field 310 may include information that indicates location, position, and/or coordinates of an NTN device. For example, according to various exemplary implementations, location of NTN device field 310 may indicate orbital element sets (e.g., state vectors, Keplerian orbital elements), Earth-Centered Inertial (ECI) position and velocity, latitude/longitudinal coordinates and altitude of satellite 205, and/or the like. In some cases, when the NTN device is not stationary, the location information may be continuously updated.

Time period availability field 315 may include date and time information that indicates time periods when an NTN device may be used in relation to a geographic area. For example, time period availability field 315 may indicate a time period when satellite 205 may be visible (e.g., line of sight) and/or allow end device 130 to wirelessly connect to satellite 205. For example, for access devices 222 of relevance, the radio spectrum indicated in radio spectrum field 325 may be available during a time period (t_available). The date and time information may include sidereal time, a mean solar time, a local sidereal time (e.g., Greenwich Mean Sidereal (GMST), GST, Universal Time, etc.), Julian Date, calendar date, and so forth.

Time period unavailability field 320 may include date and time information that indicates time periods when an NTN device may not be used in relation to a geographic area. For example, time period unavailability field 320 may indicate a time period when satellite 205 may not be visible and/or not allow end device 130 to wirelessly connect to satellite 205. For example, for access devices 222 of relevance, the radio spectrum indicated in radio spectrum field 325 may not be available during a time period (t_unavailable).

Radio spectrum field 325 may include information that indicates a radio spectrum, a radio frequency, a radio frequency band, a channel, a cell, a carrier frequency, and/or the like (also referred to as frequency (f)). As described herein, the frequency may be common to a terrestrial network device (e.g., a RAN device or access device, as described herein), such as access device 222, and a non-terrestrial network device (e.g., a satellite device, a HAPS device, etc.), such as satellite 205. According to an exemplary embodiment, the frequency may not be a primary frequency, such as a primary frequency that may be used by end device 130 for network attachment purposes. Rather, the frequency may be a secondary frequency, such as one that may be used for CA, DC, or another type of network connection. According to other exemplary embodiments, the frequency may be a primary frequency.

RAN coverage field 330 may indicate access devices of relevance that pertain or correlate to a coverage area associated with the non-terrestrial network device. For example, RAN coverage field 330 may identify access device 222-1 and access device 222-2 as access devices of relevance regarding satellite 205 and coverage area 230 in view of coverage area 225-1 and coverage area 225-2. By way of further example, RAN coverage field 330 may include identifiers (e.g., global, non-global, etc.) that identify the access device.

Manager devices field 335 may indicate network devices of relevance that pertain or correlate to the access devices indicated in RAN coverage field 330. For example, manager devices field 335 may identify an AMF, an MME, a RIC, a network management device (e.g., a SON device, an Operations, Administration, and Maintenance (OAM) device), or another network device that may coordinate the usage of a frequency between access device 222 and satellite 205, as described herein. By way of further example, manager devices field 335 may include identifiers (e.g., global, non-global, etc.) that identify the core device or another type of network device of the terrestrial network.

According to other exemplary embodiments, non-terrestrial-to-terrestrial network information may include additional, different, and/or fewer instances of information than those depicted.

Referring back to FIG. 2, core device 220 may be implemented as an AMF, an MME, or the like that may provision, instruct, or manage radio spectrum usage used by access device 222. For example, may manage and coordinate the radio spectrum usage of access device 222 relative to a non-terrestrial network device, such as satellite 205, based on the non-terrestrial-to-terrestrial network information.

According to an exemplary embodiment, core device 220 may manage the coordination based on cell barring. While cell barring may not cause access device 222 to turn off the radio and associated frequency of relevance, end device 130 may not be allowed to camp on a barred cell of access device 222.

According to another exemplary embodiment, core device 220 may manage the coordination not based on cell barring. For example, core device 220 may remove or suspend the use of a frequency of relevance (e.g., included in a frequency list) by access device 222. According to another example, core device 220 may cause the radio of access device 222 to be turned off or reduce the power of the radio to prevent connection with end device 130. Regardless of the implementation, core device 220 may provide a first time period t during which the frequency is turned off, removed, cell barred, suspended, or reduced, for example, which may be relative to coverage area 225 (e.g., in relation to a cell, a sector, a sub-sector (e.g., antenna)). Additionally, core device 220 may provide a second time period v during which the frequency is turned on, added, cell barring lifted, increased, or reengaged, for example, which may be relative to coverage area 225 (e.g., in relation to a cell, a sector, a sub-sector (e.g., antenna)).

According to another exemplary embodiment, the spectrum sharing between terrestrial and non-terrestrial networks service may be implemented by a RIC of access network 105 or another type of controller device that may manage and coordinate the radio spectrum usage of access device 222 relative to a non-terrestrial network device, such as satellite 205.

Access device 222 may be implemented as a gNB, an eNB, or another type of access device, as described herein.

Coverage area 225 may be a geographic wireless service area of access device 222. Coverage area 225 may pertain to a cell, frequency band, frequency, channel, or the like of access device 222. The shape and size of coverage area 225 is exemplary. Access device 222 may provide wireless service at a cell, sector, or sub-sector level.

Coverage area 230 may also be a geographic wireless service area of satellite 205. Coverage area 230 may pertain to a frequency band, frequency, channel, or the like of satellite 205. The shape and size of coverage area 230 is exemplary. According to various exemplary scenarios, coverage area 230 may overlap wholly or partially with coverage area 225. According to other exemplary scenarios, coverage area 230 may not overlap wholly or partially with coverage area 225. For example, satellite 205 may provide coverage area 230 that fills in a gap of wireless service by terrestrial network 102, such as access network 105 and associated access devices.

According to an exemplary embodiment, end device 130 may search and scan an RF band, channel, cell, and/or the like. For example, the RF band may be associated with a non-cellular RF band, a cellular RF band or another kind of terrestrial network RF band. According to an exemplary embodiment, end device 130 may measure a reference signal of the RF band. According to an exemplary embodiment, TN search and connection manager 210 may be configured with one or multiple threshold values (e.g., RSRP, RSRQ, Squal, etc., as described herein) to which may be used to compare the measured reference signal.

Figure 4:
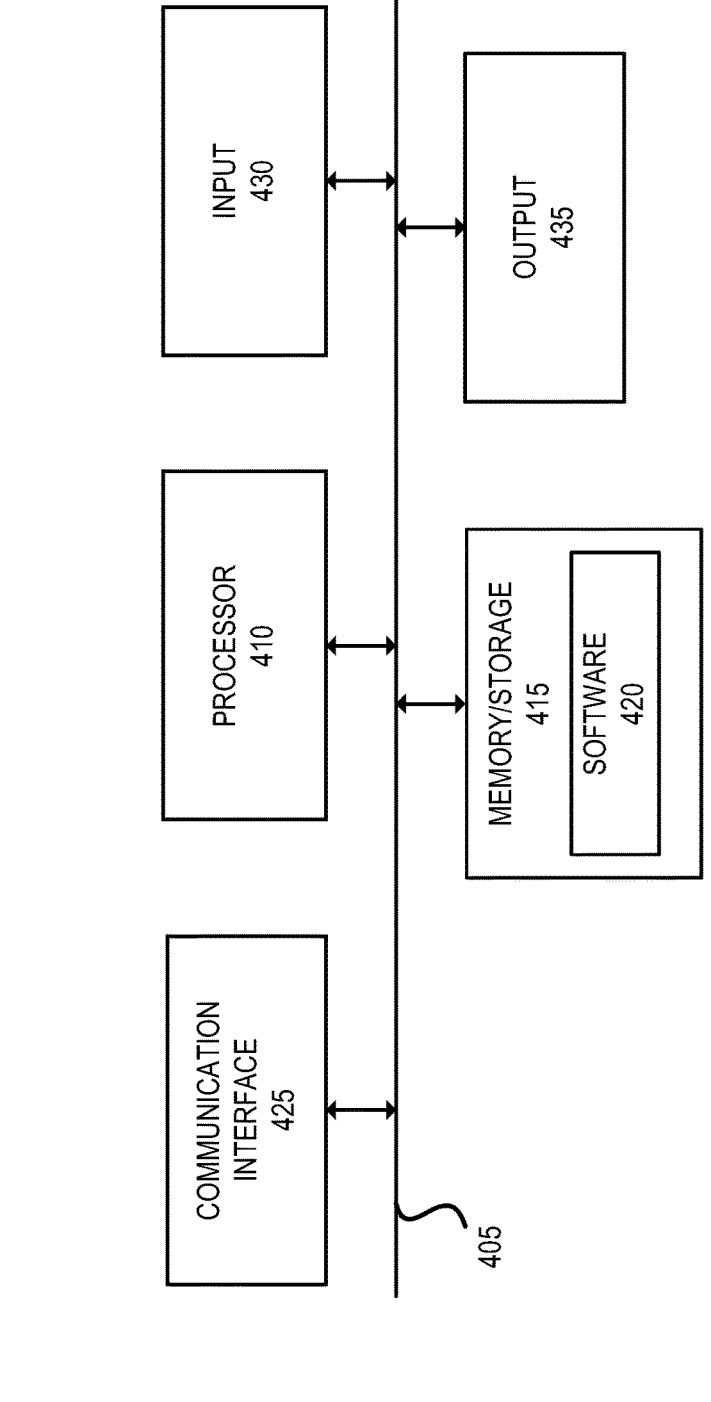
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to end device 130, a network device (e.g., access device, external device, core device, etc.), server device 215, server device 217, core device 220, access device 222, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium. Memory/storage 415 may store data, software, and/or instructions related to the operation of device 400.

Software 420 includes an application or a program that provides a function and/or a process. As an example, with reference to access device (e.g., access device 222), software 420 may include an application that, when executed by processor 410, provides a function and/or a process of the spectrum sharing between terrestrial and non-terrestrial networks service, as described herein. Software 420 may also include firmware, middleware, microcode, hardware description language (HDL), and/or another form of instruction. Software 420 may also be virtualized. Software 420 may further include an operating system (OS) (e.g., Windows, Linux, Android, proprietary, etc.). As another example, with reference to core device (e.g., core device 220 or the like), software 420 may include an application that, when executed by processor 410, provides a function and/or a process of the spectrum sharing between terrestrial and non-terrestrial networks service, as described herein. According to yet another example, server device 215 and server device 217 may be configured based on software 420 to provide a function and/or a process of the spectrum sharing between terrestrial and non-terrestrial networks service.

Communication interface 425 permits device 400 to communicate with other devices, networks, systems, and/or the like. Communication interface 425 includes one or multiple wireless interfaces, optical interfaces, and/or wired interfaces. For example, communication interface 425 may include one or multiple transmitters and receivers, or transceivers. Communication interface 425 may operate according to a protocol stack and a communication standard. Communication interface 425 may include a modem.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies. For example, a network device and/or end device 130, as described herein, may be a virtualized device.

Device 400 may be configured to perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 may be configured to perform a function or a process, as described herein, based on the execution of hardware (processor 410, etc.).

Figure 5:
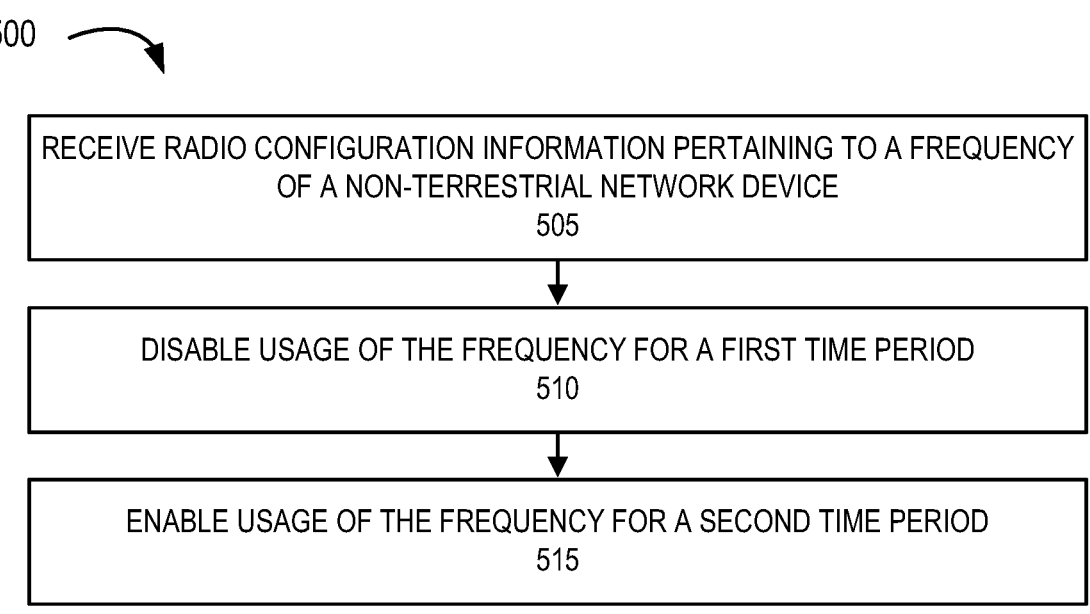
FIG. 5 is a flow diagram illustrating an exemplary process of an exemplary embodiment of the spectrum sharing between terrestrial and non-terrestrial networks service may be implemented.

FIG. 5 is a flow diagram illustrating an exemplary process 500 of an exemplary embodiment of the spectrum sharing between terrestrial and non-terrestrial networks service. According to an exemplary embodiment, an access device (e.g., access device 222) may perform process 500. According to an exemplary implementation, processor 410 executes software 420 to perform a step of process 500, as described herein. Alternatively, a step may be performed by execution of only hardware. According to some exemplary embodiments, the access device may include SON functionality.

In block 505, the access device may receive radio configuration information pertaining to a frequency of a non-terrestrial network device. For example, the access device may receive at least a portion of the non-terrestrial-to-terrestrial network information, which may include the radio configuration information, from a core device, a RIC device, or a network management device. For example, the radio configuration information may indicate a shared frequency with a non-terrestrial network device, a first time period to disable the usage of the shared frequency, and a second time period to enable the usage of the shared frequency. The radio configuration information may include other types of information, such as a cell identifier, a sector identifier, and/or a sub-sector identifier to which the shared frequency and the first and second time periods pertain.

In block 510, the access device may disable a usage of the frequency for a first time period. For example, according to various exemplary embodiments, the access device, based on the received information, may turn off a radio of relevance, reduce the power of radio and associated frequency, remove the frequency from a frequency list, suspend the usage of the frequency, cell barring, or the like, as described herein.

In block 515, the access device may reenable the usage of the frequency for a second time period. For example, according to various exemplary embodiments, the access device, based on the received information, may turn on a radio of relevance, increase the power of radio and associated frequency, add the frequency to the frequency list, unsuspend the usage of frequency, remove cell barring, or the like, as described herein.

FIG. 5 illustrates an exemplary process of the spectrum sharing between terrestrial and non-terrestrial networks service, however, according to other exemplary embodiments, the spectrum sharing between terrestrial and non-terrestrial networks service may perform additional operations, fewer operations, and/or different operations than those illustrated and described.

Figure 6:
FIG. 6 is a flow diagram illustrating another exemplary process of an exemplary embodiment of the spectrum sharing between terrestrial and non-terrestrial networks service may be implemented.

FIG. 6 is a flow diagram illustrating an exemplary process 600 of an exemplary embodiment of the spectrum sharing between terrestrial and non-terrestrial networks service. According to an exemplary embodiment, a core device (e.g., core device 220), a RAN device (e.g., a RIC device, etc.), or a network management device (e.g., a SON, an OAM device, or the like) may perform process 600. For purposes of description of process 600, the core device, the RAN device, and the network management device may be generally referred to as a manager device. According to an exemplary implementation, processor 410 executes software 420 to perform a step of process 600, as described herein. Alternatively, a step may be performed by execution of only hardware.

In block 605, the manager device may receive radio configuration information pertaining to a frequency of a non-terrestrial network device and a terrestrial RAN device. For example, the manager device may receive the radio configuration information from server device 217.

In block 610, the manager device may configure a disablement of the frequency for a first time period at the terrestrial RAN device. For example, depending on the type of disablement, the manager device may configure the access device to turn off a radio of relevance, reduce the power of a radio and associated frequency, remove the frequency from a frequency list, suspend the usage of the frequency, invoke cell barring pertaining to the frequency, or the like, as described herein.

In block 615, the manager device may configure an enablement of the frequency for a second time period at the terrestrial RAN device. For example, depending on the type of enablement, the manager device may configure the access device to turn on a radio of relevance, increase the power of a radio and associated frequency, add the frequency to a frequency list, unsuspend the usage of the frequency, lift the cell barring pertaining to the frequency, or the like, as described herein.

FIG. 6 illustrates an exemplary process of the spectrum sharing between terrestrial and non-terrestrial networks service, however, according to other exemplary embodiments, the spectrum sharing between terrestrial and non-terrestrial networks service may perform additional operations, fewer operations, and/or different operations than those illustrated and described.

Figure 7:
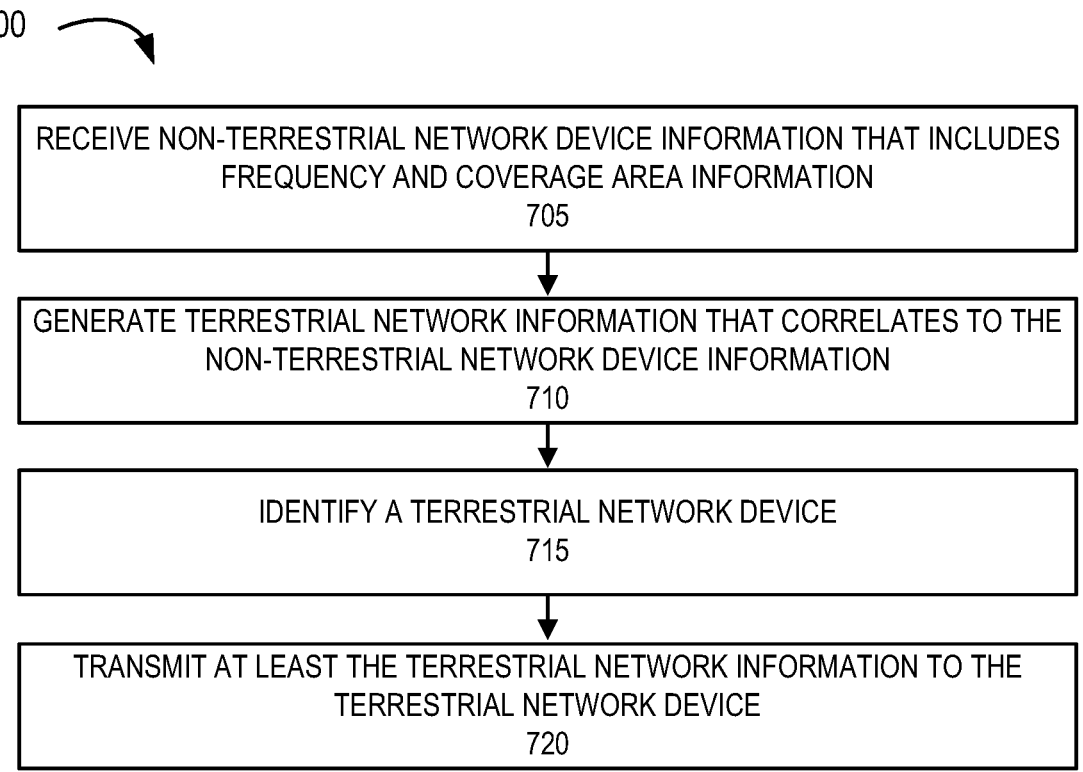
FIG. 7 is a flow diagram illustrating yet another exemplary process of an exemplary embodiment of the spectrum sharing between terrestrial and non-terrestrial networks service may be implemented.

FIG. 7 is a flow diagram illustrating an exemplary process 700 of an exemplary embodiment of the spectrum sharing between terrestrial and non-terrestrial networks service. According to an exemplary embodiment, an application layer network device (e.g., server 217) may perform process 700. According to an exemplary implementation, processor 410 executes software 420 to perform a step of process 700, as described herein. Alternatively, a step may be performed by execution of only hardware.

In block 705, the application layer network device may receive non-terrestrial network information that includes frequency and coverage area information. For example, a server device may receive the non-terrestrial network information from non-terrestrial network devices, as described herein. In block 710, the application layer network device may generate terrestrial network information that correlates to the non-terrestrial network device information. For example, the server device may generate the terrestrial network information based on network topology and radio configuration information associated with radio access network devices of relevance pertaining to the non-terrestrial network information, as described herein. In block 715, the application layer network device may identify a terrestrial network device. In block 720, the application layer network device may transmit at least the terrestrial network information to the terrestrial network device.

FIG. 7 illustrates an exemplary process of the spectrum sharing between terrestrial and non-terrestrial networks service, however, according to other exemplary embodiments, the spectrum sharing between terrestrial and non-terrestrial networks service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the processes illustrated in FIGS. 5, 6, and 7 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a radio access network device, radio configuration information including a frequency of a non-terrestrial network device and a time period during which the non-terrestrial network device cannot wirelessly connect with end devices in a first coverage area due to a location of the non-terrestrial network device;
   disabling, by the radio access network device based on the radio configuration information, the frequency at the radio access network device for a first time period; and
   enabling, by the radio access network device after the disabling and during the time period, the frequency at the radio access network device for a second time period.

2. The method of claim 1, wherein the non-terrestrial network device includes a satellite device that can wireless connect with the end devices.

3. The method of claim 1, wherein the disabling comprises:
   cell barring, by the radio access network device, the end devices from using the frequency.

4. The method of claim 1, wherein the disabling comprises:

turning off, by the radio access network device, a radio that provides the frequency.

5. The method of claim 1, wherein the enabling comprises:

turning on, by the radio access network device, a radio that provides the frequency.

6. The method of claim 1, wherein the first coverage area of the non-terrestrial network device overlaps with at least a portion of a second coverage area of the radio access network device.

7. The method of claim 1, wherein the frequency is not used for attachment with the end devices by the radio access network device.

8. The method of claim 1, wherein the first time period is a time during which the end devices can wirelessly connect to the non-terrestrial network device via the frequency.

9. A radio access network device comprising:

a processor that is configured to:

receive radio configuration information including a frequency of a non-terrestrial network device and a time period during which the non-terrestrial network device cannot wirelessly connect with end devices in a first coverage area due to a location of the non-terrestrial network device;

disable, based on the radio configuration information, the frequency at the radio access network device for a first time period; and enable, after the disablement and during the time period, the frequency at the radio access network device for a second time period.

10. The radio access network device of claim 9, wherein the non-terrestrial network device includes a satellite device that can wireless connect with the end devices.

11. The radio access network device of claim 9, wherein, when disabling, the processor is further configured to:

cell bar the end devices from using the frequency.

12. The radio access network device of claim 9, wherein, when disabling, the processor is further configured to:

turn off a radio that provides the frequency.

13. The radio access network device of claim 9, wherein, when enabling, the processor is further configured to:

turn on a radio that provides the frequency.

14. The radio access network device of claim 9, wherein the first time period is a time during which the end devices can wirelessly connect to the non-terrestrial network device via the frequency.

15. The radio access network device of claim 9, wherein the first coverage area of the non-terrestrial network device overlaps with at least a portion of a second coverage area of the radio access network device.

16. The radio access network device of claim 9, wherein the frequency is not used for attachment with the end devices by the radio access network device.

17. A non-transitory computer-readable storage medium storing instructions executable by a processor of a radio access network device, wherein the instructions are configured to:

receive radio configuration information including a frequency of a non-terrestrial network device and a time period during which the non-terrestrial network device cannot wirelessly connect with end devices in a first coverage area due to a location of the non-terrestrial network device;

disable, based on the radio configuration information, the frequency at the radio access network device for a first time period; and enable, after the disablement and during the time period, the frequency at the radio access network device for a second time period.

18. The non-transitory computer-readable storage medium of claim 17, wherein the instructions to disable are further configured to:

turn off a radio that provides the frequency.

19. The non-transitory computer-readable storage medium of claim 17, wherein the instructions to enable are further configured to:

turn on a radio that provides the frequency.

20. The non-transitory computer-readable storage medium of claim 17, wherein the first coverage area of the non-terrestrial network device overlaps with at least a portion of a second coverage area of the radio access network device.

* * * * *